(12) United States Patent
Liang et al.

(10) Patent No.: US 10,438,056 B2
(45) Date of Patent: Oct. 8, 2019

(54) FACE RECOGNITION SYSTEM AND FACE RECOGNITION METHOD

(71) Applicant: YUTOU TECHNOLOGY (HANGZHOU) CO., LTD., Hangzhou (CN)

(72) Inventors: Ningqing Liang, Hangzhou (CN); Hongxin Zhang, Hangzhou (CN)

(73) Assignee: YUTOU TECHNOLOGY (HANGZHOU) CO., LTD., Hangzhou (CN)

( * ) Notice: Subject to any disclaimer, the term of this patent is extended or adjusted under 35 U.S.C. 154(b) by 14 days.

(21) Appl. No.: 15/741,063

(22) PCT Filed: Jun. 21, 2016

(86) PCT No.: PCT/CN2016/086631
§ 371 (c)(1),
(2) Date: Dec. 29, 2017

(87) PCT Pub. No.: WO2017/000816
PCT Pub. Date: Jan. 5, 2017

(65) Prior Publication Data
US 2018/0121714 A1    May 3, 2018

(30) Foreign Application Priority Data

Jun. 30, 2015 (CN) .......................... 2015 1 0383515

(51) Int. Cl.
*G06K 9/00* (2006.01)
*G07C 9/00* (2006.01)

(52) U.S. Cl.
CPC .......... *G06K 9/00295* (2013.01); *G06K 9/00* (2013.01); *G06K 9/00255* (2013.01); *G06K 9/00268* (2013.01); *G07C 9/00158* (2013.01)

(58) Field of Classification Search
CPC .......... G06K 9/00295; G06K 9/00268; G06K 9/00255; G06K 9/00; G07C 9/00158
(Continued)

(56) References Cited

U.S. PATENT DOCUMENTS

2014/0010458 A1* 1/2014 Nakamura ......... G06K 9/00281
382/195
2015/0139492 A1* 5/2015 Murakami ......... G06K 9/00268
382/103

FOREIGN PATENT DOCUMENTS

CN 102663400 9/2012
CN 103761514 4/2014
(Continued)

OTHER PUBLICATIONS

IB, "International Search Report for Corresponding International Application No. PCT/CN2016/086631," dated May 1, 2017, Publisher: WIPO.

*Primary Examiner* — Amandeep Saini
(74) *Attorney, Agent, or Firm* — Terry M. Sanks, Esq.; Beusse Wolter Sanks & Maire, PLLC

(57) ABSTRACT

The present invention relates to a face recognition system and a face recognition method, mainly comprising a lighting preprocessing module, a feature generation module, a facial feature library module, and a feature matching and recognition module. In the face recognition method, the inputted face image is first light-difference optimized by means of the lighting preprocessing module, then a feature vector of the face image is generated by means of the feature generation module; then, the feature vector to be recognized is matched with all of the feature vectors in the feature library and computed to arrive at an identity result corresponding to the feature vector to be recognized. In the technical solutions of the present invention, the identity of a face image to be recognized may be determined in real time for a system (Continued)

whose computing resources are limited, using a short period of time and having high accuracy.

4 Claims, 1 Drawing Sheet

(58) Field of Classification Search
USPC .......................................................... 382/118
See application file for complete search history.

(56) References Cited

FOREIGN PATENT DOCUMENTS

| | | | |
|---|---|---|---|
| CN | 103761514 A | * | 4/2014 |
| CN | 104268539 | | 1/2015 |

* cited by examiner

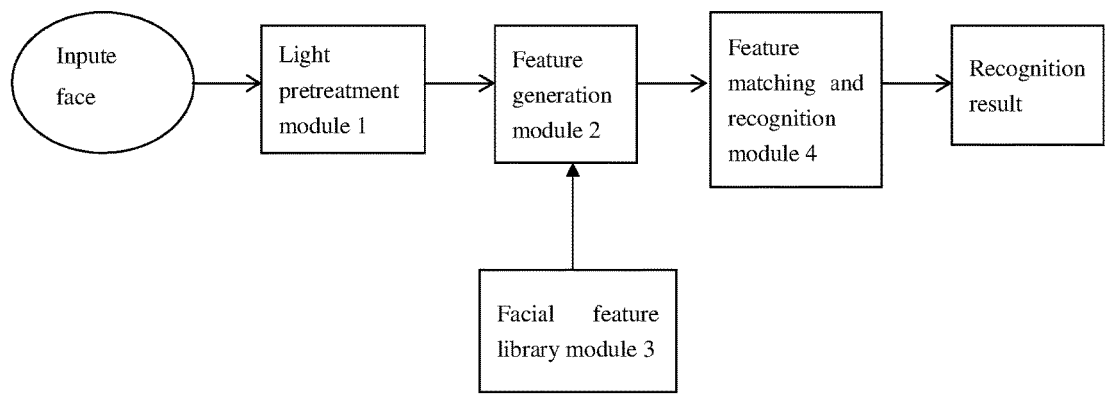

FACE RECOGNITION SYSTEM AND FACE RECOGNITION METHOD

CROSS-REFERENCE TO RELATED APPLICATIONS

The present application claims priority to and the benefit of Chinese Patent Application No. CN 201510383515.9, filed on Jun. 30, 2015, the entire content of which is incorporated herein by reference.

BACKGROUND OF THE INVENTION

1. Field of the Invention

The invention relates to the field of identification, more particularly, to a face recognition system and face recognition method.

2. Description of the Related Art

Generally, the existing facial recognition technology applied in entrance guard and security system solves the problem of facial recognition based on specific location and specific light conditions. This solution can be deployed on both high performance computers and embedded computers with low computing resources. Since the entrance guard and security system allows the response of the result to have a delay of one second or even longer, and it is generally a one-time authentication requirement, with few continuous processing scenarios, and thus using the algorithm with high computational complexity is necessary.

The defects of the facial recognition technology solution used on entrance guard and security system are as follows: 1. The light conditions need to be fixed by compensating the light source, and it is very sensitive to the light; 2. It requires to collect fixed facial pose, such as frontal view of the face; 3. Generally, the computational complexity of it is high. It takes a long time to yield a result and it can hardly meet the requirement of real-time response during the continuous detection.

SUMMARY OF THE INVENTION

Given that the foregoing problems exist in the existing entrance guard and security system, the present invention provides a facial recognition system and facial recognition method applied in robot vision system to implement the function of facial identity recognition after detecting the face area, which can be applied in various light conditions comprising the situation of polarized light or non compensated light source, and said invention is able to recognize faces in multiple positions, such as faces on the left, right, upside, down and even to one side. At the same time, said invention can reduce computation complexity so that the computing resource consumption can be reduced for real-time recognition of faces appearing in robot vision, which requires higher response speed, and real-time feedback is achieved through continuous identification when face identity changes.

Detailed technical solutions are as follows:
A facial recognition system, wherein, comprises,
a light pretreatment module receiving inputted identifying face image and optimizing the light difference degree of said identifying face image and inputting said identifying face image to next module;
a feature generation module connecting to said light pretreatment module, for receiving said identifying face image after light pretreatment and generating features, and outputting the identifying feature vector used for describing of the features of face details;
a facial feature library module pre-storing feature vectors of known faces;
a feature matching and recognition module connecting to said feature generation module and said face feature library module, for matching and calculating said identifying feature vector outputted by said feature generation module with all feature vectors in said facial feature library, to give the corresponding identity of the identifying feature vector.

Preferably, the said facial recognition system, wherein, said light pretreatment module uses difference of Gaussians method to process said identifying face image.

Preferably, the said facial recognition system, wherein, said feature generation module adopts local binary patterns feature to describe said feature vector of facial detail features.

Preferably, the said facial recognition system, wherein, said facial feature library module provides new facial feature adding interface to add new facial features of known faces or unknown faces to said facial feature library.

The invention further provides a facial recognition method, wherein, based on any of said facial recognition system of claim 1 to claim 4, said method comprises:
Step 1, initializing said facial feature library module for pre-storing known facial feature vectors in said facial feature library module;
Step 2, said light pretreatment module receiving inputted identifying face image, to optimize the light difference degree of said identifying face image and output said identifying face image after light pretreatment;
Step 3, said feature generation module receiving said identifying face image after light pretreatment, to generate features of said identifying face image and output the identifying feature vector used for describing the facial detail feature;
Step 4, said feature matching and recognition module matching and calculating said identifying feature vector outputted by said feature generation module with all feature vectors in said facial feature library, to give the corresponding identity of the identifying feature vector.

Preferably, said facial recognition method, wherein, in said step 2, said light pretreatment module uses difference of Gaussians method to process said identifying face image.

Preferably, said facial recognition method, wherein, in said step 3, adopts local binary patterns feature to describe said feature vector of facial detail feature.

Preferably, said facial recognition method, wherein, in said step 4, if said feature matching and recognition module judges the face to be recognized is unknown, said facial recognition method will output unknown recognition result and store said unknown facial feature vector in face feature library module.

The advantages and beneficial effects of said technical solutions are as follows:

The technical solutions of the invention can implement the function of facial identity recognition after detecting the face area. Said technical solutions can be applied to various light conditions comprising the situation of polarized light or non compensated light source, and it is able to recognize face in multiple positions, such as faces on the left, right, upside, down and even to one side. At the same time, said technical solutions can reduce computation complexity so that the computing resource consumption can be reduced, to response with a faster speed, for real-time recognition of faces appearing in robot vision and achieving real-time feedback through continuous identification when face identity changes.

BRIEF DESCRIPTIONS OF THE DRAWINGS

The accompanying drawings, together with the specification, illustrate exemplary embodiments of the present disclosure, and, together with the description, serve to explain the principles of the present invention.

FIG. 1 is a block diagram of a function of a facial recognition system.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

As shown in FIG. 1, the facial recognition system is mainly applied to robot vision system, mainly comprises 1. a light pretreatment module; 2. a feature generation module; 3. a facial feature library module; 4. a feature matching and recognition module.

Wherein, the light pretreatment module optimizes the light difference degree of inputted identifying face image to reduce the influence of light change on system recognition rate. Said light pretreatment module uses difference of Gaussians method to process said identifying face image. The influence of light change on the same face image can be considered to superimpose a low frequency signal on the image, and the Gauss convolution operation on the face image can be considered as a low-pass filter. The Gauss convolution operation of two different size convolution kernels can be used to construct a Gauss difference operation, and the effect can be considered as a band-pass filter. Since the frequency of effective feature used for facial recognition is usually higher than the frequency of illumination signal, the difference filter composed by two different size convolution kernels selected properly can remove the influence of light change in face image. More than 10 methods are used to deal with light changes in image processing or image enhancement. After combining effect and calculating resources, the difference of Gaussians is used in the embodiment. The feature generation module connecting to said light pretreatment module, for receiving said identifying face image after light pretreatment and generating features, and outputting the identifying feature vector used for describing the features of face details. The existing feature types used to describe face comprises Principal Component Analysis (PCA), Independent Component Analysis (CAI), Local Binary Pattern (LBP) and trained through deep neural network, of which LBP is the best choice to meet the requirements of application. The advantages of LBP (Local Binary Pattern) comprises two points: the first one is fixed point calculation, which the amount of calculation is greatly reduced in comparison with other features, in particular, the advantage of computational complexity is more obvious on a processor with no floating point computing power in the ARM (a microprocessor reducing instruction set, and it also refers to a computing system built by the processor) framework; the second one is the feature of LBP (Local Binary Pattern) is similar to a difference essentially which can resist a certain amount of light change, which can continue to weaken the adverse effect of light change information that cannot be eliminated in the light pretreatment module on the recognition rate of the system. After the feature generation module 2 generates the feature of the identifying face image, the identifying feature vector will be stored in the facial feature library module 3, in which the known facial features are pre-stored. When recognizing the face image, the system recognition logic compares the feature vectors of the identifying face images with the facial feature vectors of the facial recognition module 3, and finds the most similar faces. At this time, it is necessary to complete the recognition step through querying the face feature library module 3. Since the LBP (Local Binary Pattern) feature of the single face image can only be used to recognize the face image with small angle, the technical solutions of the invention manages the feature vectors set of the same person at different angles through collecting more angles of face image features. The feature matching and recognition module 4 connects to the feature generation module 2 and the face feature library module 3. When a recognition is requested, the feature matching and recognition module 4 will match and calculate the identifying feature vector outputted by the feature generation module 2 with all feature vectors in the facial feature library 2, find the nearest feature vector and give the similarity value, and judge whether the identifying face is the one with the closest feature according to the preset threshold of the similarity value. If the identifying face is the one with the closest feature, the corresponding identity of the identifying face will be given; if not, judging the identifying face is unknown, if it is necessary, adding the unknown facial feature vector to the face feature library module 3 and adding identity information for next recognition.

The facial recognition system is composed of said function module. A face posture correction technique exists in the existing technology for reducing the influence of difference face positions on the recognition accuracy when the collecting face images. However, to achieve better results, the function module needs more computing resources, which makes the computation beyond the real-time processing capability of a low resource system. Therefore a collection of face with more angles is used. At the same time, the matching method of the feature matching and recognition module 4 enables the matching result can still solve the problem of facial recognition with different positions to achieve similar results.

The facial recognition system and the facial recognition method of the invention will now be described in detail hereinafter with reference to a specific embodiment.

The facial recognition system with low resource demand of the invention can be used in facial recognition of robot on-board vision system. The hardware resource used in the embodiment is the Samsung Exynos 5410 processing platform, and the software solution used is all functional modules based on the c++ language implementation plan, which is solidified to the processing platform. And then initializing the facial feature library module 3, that is, to collect 8 positions of feature vectors of face image comprising 5 positions of left 2, left 1, middle, right 1 and 3 positions of upper, middle, lower, and storing the positions to the facial feature library module 3. After that, randomly inputting a face image and judging the identity of the face image. The recognition speed is about 200 milliseconds which meets the application scene of the robot interaction.

To summarize, the invention discloses a facial recognition system and a facial recognition method, which solves the problem of facial recognition with obvious changes in light and shooting angle when the computing resource is limited. The technical solution of the invention can judge the most possible identification of the identifying face in real-time on the system with limited computing resource and give the confidence rate. The solution supports the recognition of 20~50 people. When defining the following light condition as the evenly changes of the brightness in the face image, that is, the brightness of different face images can be different, but the side light cannot be existed in one face image, and the angle condition is that the left and right deflects are within 40 degrees and the upper and lower deflects are within 30 degrees., the upper and lower deflects are within 30 degrees, the recognition rate of 20 people is over 90% and the recognition rate of 50 people is over 80%.

The technical personnel in the field should understand that the change embodiment can be achieved combined with the existing technology and the said embodiment, and will not be described here. Such change embodiment does not affect the substance of the invention, and will not be described here.

What is claimed is:

1. A face recognition system, comprising:
   a light pretreatment module receiving inputted identifying face image and optimizing alight difference degree of said identifying face image and inputting said identifying face image to next module, the light pretreatment module uses difference of Gaussians method to process said identifying face image a Gauss convolution operation of two different size convolution kernels is used to construct a Gauss difference operation;
   a feature generation module connecting to said light pretreatment module, for receiving said identifying face image after light pretreatment and generating features, and outputting the identifying feature vector used for describing the features of face details, the feature generation module uses local binary patterns feature to describe said feature vector of facial detail features;
   a facial feature library module pre-storing feature vectors of known faces; and
   a feature matching and recognition module, connecting to said feature generation module and said face feature library module, for matching and calculating said identifying feature vector outputted by said feature generation module with all feature vectors in said facial feature library, to give the corresponding identity of the identifying feature vector, the facial feature library comprises 8 positions of feature vectors of face image comprising 5 positions of left 2, left 1, middle, right 1, right 2 and 3 positions of upper, middle, lower, angle condition is that the left and right deflects are within 40 degrees and the upper and lower deflects are within 30 degrees.

2. The face recognition system of claim 1, wherein said facial feature library module provide new facial feature adding interface to add new facial features of known faces or unknown faces to said facial feature library.

3. A face recognition method, wherein, based on any of said facial recognition system of claim 1, said method comprises:
   Step 1, initializing said facial feature library module for pre-storing known facial feature vectors in said facial feature library module;
   Step 2, said light pretreatment module receiving inputted identifying face image and after optimizing a light difference degree of said identifying face image, said light pretreatment module inputting said identifying face image, the light pretreatment module uses difference of Gaussians method to process said identifying face image in said step 2;
   Step 3, a feature generation module receiving said identifying face image after light pretreatment and generating features of said identifying face image, and outputting the identifying feature vector used for describing the facial detail feature, uses local binary patterns feature to describe said feature vector of facial detail feature in step 3; and
   Step 4, said feature matching and recognition module matching and calculating said identifying feature vector outputted by said feature generation module with all feature vectors in said facial feature library, to give the corresponding identity of the identifying feature vector, the facial feature library comprises 8 positions of feature vectors of face image comprising 5 positions of left 2, left 1, middle, right 1, right 2 and 3 positions of upper, middle, lower angle condition is that the left and right deflects are within 40 degrees and the upper and lower deflects are within 30 degrees.

4. The face recognition method of claim 3, wherein, if said feature matching and recognition module judges a face to be recognized is unknown, said facial recognition method will output unknown recognition result and store said unknown facial feature vector in face feature library module.

\* \* \* \* \*